United States Patent
Lin

(10) Patent No.: US 9,842,445 B2
(45) Date of Patent: Dec. 12, 2017

(54) PASSIVE REMOTE KEYLESS ENTRY SYSTEM WITH TIME-BASED ANTI-THEFT FEATURE

(71) Applicant: Xing Ping Lin, Orchard Lake, MI (US)

(72) Inventor: Xing Ping Lin, Orchard Lake, MI (US)

(73) Assignee: TRW Automotive U.S. LLC, Farmington Hills, MI (US)

( * ) Notice: Subject to any disclaimer, the term of this patent is extended or adjusted under 35 U.S.C. 154(b) by 132 days.

(21) Appl. No.: 14/322,418

(22) Filed: Jul. 2, 2014

(65) Prior Publication Data
US 2015/0015367 A1 Jan. 15, 2015

Related U.S. Application Data

(60) Provisional application No. 61/846,133, filed on Jul. 15, 2013.

(51) Int. Cl.
*G07C 9/00* (2006.01)
*B60R 25/20* (2013.01)
*B60R 25/01* (2013.01)

(52) U.S. Cl.
CPC .......... *G07C 9/00309* (2013.01); *B60R 25/01* (2013.01); *B60R 25/20* (2013.01); *G07C 2009/00555* (2013.01); *G07C 2009/00769* (2013.01)

(58) Field of Classification Search
None
See application file for complete search history.

(56) References Cited

U.S. PATENT DOCUMENTS

| 8,659,388 B2 | 2/2014 | Biondo et al. |
| 2003/0001723 A1 | 1/2003 | Masudaya |
| 2006/0044108 A1* | 3/2006 | Nowottnick ............ B60R 25/24 340/5.61 |
| 2009/0256674 A1 | 10/2009 | Lee et al. |
| 2010/0308961 A1 | 12/2010 | Ghabra |
| 2014/0330449 A1* | 11/2014 | Oman ................... G01S 13/765 701/2 |

FOREIGN PATENT DOCUMENTS

| CN | 1448728 | 10/2003 |
| DE | 10112573 A1 | 10/2002 |
| WO | 2005088561 | 9/2005 |

OTHER PUBLICATIONS

"New Door Closure Concepts", authors Stephan Schmitz et al., pp. 118-120, Automotive Engineering International/Sep. 2000.
"Some Attacks Against Vehicles' Passive Entry Security Systems and their solutions", authors Ansaf Ibrahem Alrabady & Syed Masud Mahmud, pp. 431-439, IEEE Transactions on Vehicular Technology, vol. 52, No. 2, Mar. 2003.
Relay Attacks on Passive Keyless Entry and Start Systems in Modern Cars:, authors Aurellien Francillon et al., Feb. 7, 2011—Associated Event: NDSS Symposium 2011.

* cited by examiner

*Primary Examiner* — Daniell L Negron
(74) *Attorney, Agent, or Firm* — Tarolli, Sundheim, Covell & Tummino LLP

(57) ABSTRACT

Method for preventing security breaches via the two-thief method of attack of passive remote keyless entry systems for vehicles. The method involves the measurement of air travel time of the RF messages between the RKE fob and the vehicle. Multiple round trips between the fob and the vehicle are employed to magnify the distance covered by the messages and thereby allow accurate measurement of the air travel time.

19 Claims, 2 Drawing Sheets

PASSIVE REMOTE KEYLESS ENTRY SYSTEM WITH TIME-BASED ANTI-THEFT FEATURE

CROSS REFERENCE TO RELATED APPLICATIONS

This patent application claims priority to and the benefit of U.S. Provisional Application Ser. No. 61/846,133, filed Jul. 15, 2013, entitled PASSIVE REMOTE KEYLESS ENTRY SYSTEM WITH TIME BASED ANTI-THEFT FEATURE, which is incorporated herein by reference in its entirety.

FIELD OF THE INVENTION

The present invention is directed to a method for preventing security breaches via the two-thief method of attack of passive remote keyless entry systems for vehicles.

BACKGROUND

Vehicles today are often equipped with electronic entry systems. Such systems allow entry into, and (in some systems) starting and operation of, the vehicle without using a conventional mechanical key or requiring any other overt unlocking action by the owner. In such systems, often referred to as 'passive' remote keyless entry ("RKE") systems, a low frequency ("LF") radio signal, typical around 125 KHz, is transmitted by the vehicle to a fob carried by the vehicle owner, and the fob responds by returning a radio frequency ("RF") signal (e.g. 315 MHz or 434 MHz) back to the vehicle. Upon receipt of an RF signal from an authorized fob, the vehicle will unlock the doors to permit driver entry into the vehicle.

More specifically, when a driver approaches the vehicle and lifts the handle of the vehicle door, the driver contact with the door handle will be detected electronically at the vehicle (e.g. by tripping a mechanical switch when the handle is lifted, or by electrostatic detection of touch, or by the driver's fingers interrupting an optical beam). Upon detection of the driver contact with the door handle, the RKE controller at the vehicle will trigger an LF transmitter inside the controller. The LF transmitter will create an LF field in the vicinity of the vehicle door that will, in turn, be detected by an LF receiver inside the fob. Upon detection of a proper LF field, the fob will compose and transmit back to the vehicle a digital message (a datagram) modulated on an RF signal. The RF receiver inside the vehicle will demodulate and decode the digital message and, if the content of the message indicates that the message came from an authorized fob, will unlock the vehicle doors. Similar methods are sometimes used for enabling an "engine start" button on the dashboard of the vehicle, whereby the owner may even operate the vehicle without use of a mechanical key.

Identification codes and encryption are conventionally used to ensure that the communication link between the fob and the vehicle is secure. Such codes and encryption are very difficult to duplicate. Therefore, the fob message required to gain entry into the vehicle cannot readily be synthesized by a thief. Even with such codes and encryption, however, potential vulnerabilities still exist. One known vulnerability involves two thieves working in concert to intercept and immediately use a bona fide fob message to trick the vehicle RKE system into believing that the fob is near the vehicle, when in fact the person carrying the fob has walked away from the vehicle.

The two-thief scenario is depicted in FIG. 1. In this scenario, each thief carries an RF relay device. Radio signals received at one device are relayed to the other device via a different, device-to-device frequency channel. At the other device, the radio signals are returned to their original frequency channel and re-broadcast.

When the person carrying the fob leaves the vehicle and walks away, the first thief will position himself and his device near the vehicle. The second thief will follow the person carrying the fob, thereby keeping the second thief's device near the fob. The first thief will approach the vehicle and lift the door handle, triggering the LF transmitter inside the vehicle. The first theft's device will be designed to receive the LF signal transmitted by the LF transmitter inside the vehicle, to frequency-shift the LF signal to the different, device-to-device frequency channel, and to broadcast the frequency-shifted signal to the second thief.

The second thief's device will receive the frequency-shifted signal via the device-to-device frequency channel. The device will frequency-shift the signal back to its original LF channel and then re-transmit it. The fob, being in the vicinity of the second thief's device, will receive the LF signal and, so long as the device-to-device communication process has not corrupted the LF signal very much, will interpret it as a legitimate LF interrogation from the vehicle. The fob will thus respond by assembling a datagram for accessing the vehicle, including all of the associated security codes and encryption, and then transmitting the datagram as an RF message.

The second thief's device will be designed to receive the RF signal transmitted by the fob, to frequency-shift the RF signal to the different, device-to-device frequency channel, and to broadcast the frequency-shifted signal back to the first thief. The first thief's device will receive the frequency-shifted signal via the device-to-device frequency channel. The device will then restore (frequency-shift) the fob signal back to its original RF channel and re-transmit it. The vehicle, being near the first thief's device, will receive the restored RF signal and decode the included datagram. So long as the device-to-device communication process has not corrupted the RF signal very much and assuming that the associated security codes and encryption were generated by an authorized fob, the vehicle will recognize the RF signal as a legitimate RF response from the fob. The vehicle will thus respond by allowing access to the vehicle, unlocking the doors and (in some systems) allowing starting and operation of the vehicle.

Thus, in summary, through use of this technique the two thieves avoid the necessity of understanding and synthesizing the security codes and encryption used by the fob, instead triggering the fob to create a legitimate access message and then transporting the message back to the vehicle to gain access to the vehicle.

SUMMARY OF THE INVENTION

The present invention provides a method for defeating a two-thief attack on a passive RKE system.

In accordance with one example embodiment of the present invention, a method is provided for preventing security breaches of a passive remote keyless entry system for a vehicle, comprising the steps of sending radio signals back and forth between the vehicle and a remote fob multiple times, measuring the total time for completion of the multiple round trips, and using the measured total time to evaluate the security of the connection between the fob and the vehicle.

In accordance with another example embodiment of the present invention, an anti-theft method is provided for a vehicle having a passive keyless entry system that is responsive to a remote fob. The method comprises the steps of interrogating the fob from the vehicle, initiating the as next interrogation from the vehicle in timed relation to the receipt of a valid response to the previous interrogation, repeating the initiating step until a predetermined number of valid responses have been received from the fob, measuring the total time required to complete the predetermine number of valid responses, and analyzing the measured time to determine whether to allow at least one vehicle function.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
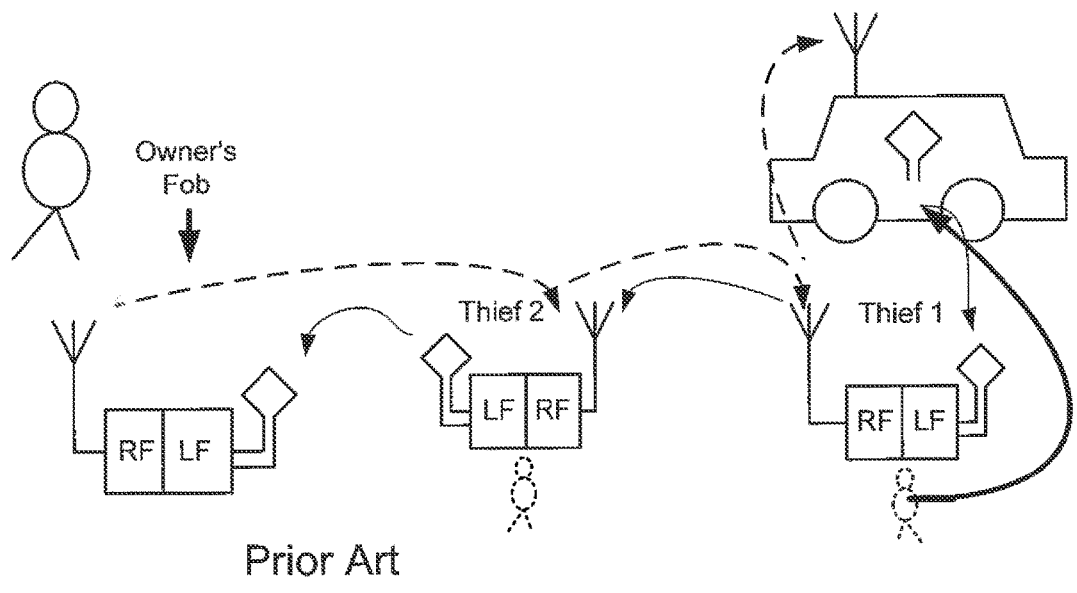
FIG. 1, already described above, illustrates the known two-thief scenario for avoiding the security features of conventional passive RKE systems.
Figure 2:
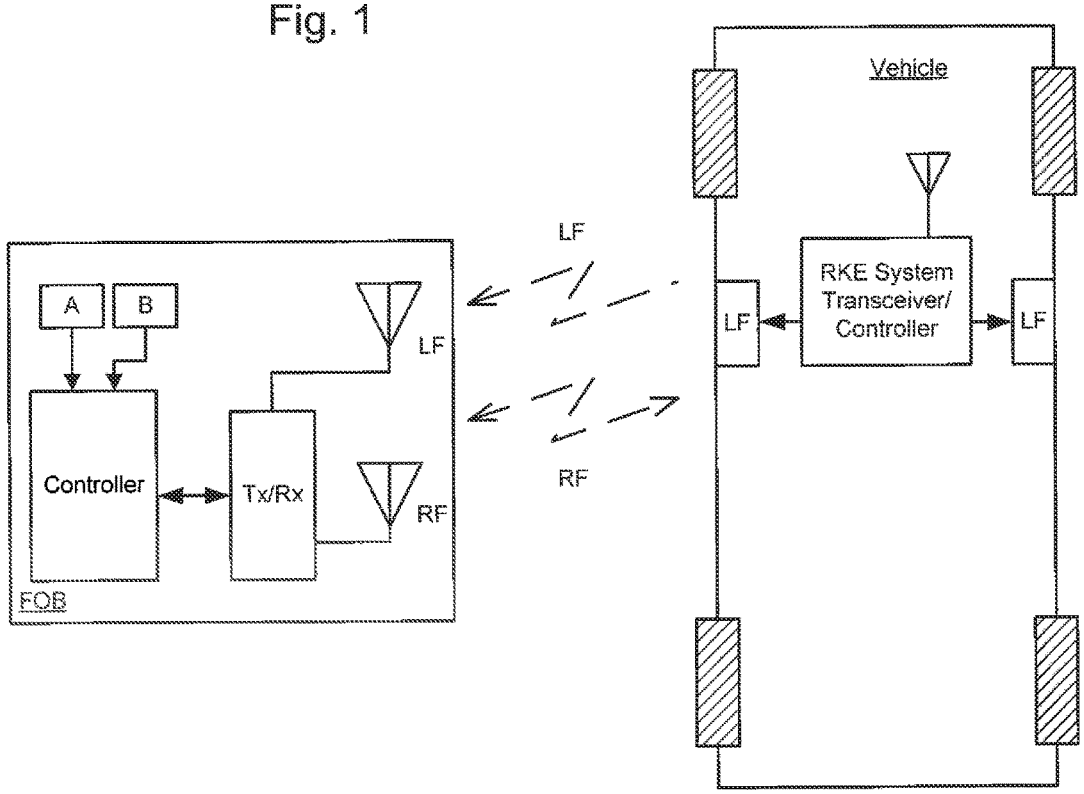
FIG. 2 is a block diagram of a passive RKE system including LF interrogation by the vehicle and RF response from the fob.

The present invention will find use in any conventional passive RKE system, such as the system shown in block diagram form in FIG. 2. As shown in FIG. 2, the system includes a vehicle-mounted RKE controller that communicates with a portable, battery-operated fob. The fob is small and will conveniently be carried close at hand by the vehicle operator in his/her pocket or hand, on a lanyard or in a bag, etc.

The vehicle-mounted RKE controller is of known construction and will include, for example, a microcontroller including a system clock generator, a central processing unit (CPU), program memory (ROM), random access memory (RAM), programmable timers, analog-to-digital and digital-to-analog convertors, interrupt controllers, serial interfaces, and so on. The RKE controller operates various vehicle systems (not separately shown) including entry controls, ignition controls, and other systems. The functioning of the RKE controller is managed by the CPU operating under control of a program stored in ROM.

The RKE controller will operate the controlled systems in response to radio communications exchanged with the fob. For this purpose, the RKE controller will include (a) an RF antenna and an RF transceiver for receiving and transmitting RF messages to and from the fob on a carrier frequency of, for example, 315 MHz, and (b) one or more LF antennas and an LF transmitter for generating a localized LF field at a frequency of, for example, 125 kHz, for triggering a fob to send an RF message.

The fob will similarly be equipped with LF and RF antennas so that the fob may receive the LF signals broadcast from the LF antennas on the vehicle and may receive RF signals from, and transmit RF signals to, the RF antenna on the vehicle. The LF and RF antennas are connected to a transmitter/receiver, which in turn is connected to and controlled by a fob controller. The controller may be an application specific integrated circuit ("ASIC") configured as a state machine, or a programmed microcomputer. In either case, the controller will monitor the states of buttons (e.g., buttons A and B in the figure) on the fob and broadcast via the RF antenna suitable RF messages responsive to button depressions performed by the person holding the fob. The fob controller will also cause the transmitter/receiver to listen for LF or RF interrogation or signals broadcast by the vehicle and received by the fob's LF or RF antenna, and will broadcast via its RF antenna suitable RF messages responsive to the LF or RF signals received. The message will be transmitted with security codes and encryption.

In accordance with the present invention, an antitheft method is introduced for defeating the two-thief scenario. The method may be implemented, for example, in the system shown in FIG. 2. The method involves the measurement of the air travel time of the communication exchanges between the fob and the vehicle.

RE signals travel at the speed of light. An RF round trip of 50 meters distance therefore only takes 333 nS. It is very difficult to measure such short times directly without using expensive, higher power, higher frequency devices. The present invention contemplates the use of a variety of techniques to implement the air travel time measurement despite the short travel times.

First, the present invention contemplates magnifying the air travel time by requiring the RF signals to make multiple round trips between the fob and the vehicle. The use of multiple round trips effectively lengthens the travel distance to multiples of the actual distance, thereby increasing by a corresponding amount the air travel time. The length of this longer air travel time is easier to measure accurately.

In theory the signal transmitted from the vehicle to the fob during the air travel time test could be an LF (125 KHz) signal. However, due to complications introduced by the low frequency, including slow speed and communication delays between multiple control circuits and implementations of actual LF circuits on the vehicle or fob side, it is presently preferred to use only RF signals during the air travel time test. Thus, the higher frequency RF signal (e.g. 315 MHz) will preferably be used for communications in both direction, vehicle to fob and fob to vehicle, during the air travel time test.

To simplify the air travel time test, the RF message that is used in the test is a special, short test message rather than a full fob datagram. The air travel time test is conducted after the usual handshaking between the vehicle and the fob. That is, the vehicle will first send a conventional LF interrogation signal and the fob will respond with an RF response including a datagram with an access request and suitable codes and encryption. The air travel time test will be initiated thereafter, but only if that handshaking process has been completed successfully and has confirmed that the datagram was generated by an authorized fob.

The air travel time test will preferably be designed to prevent a thief from faking the owner's fob's air travel time test response. Different formats (e.g., number of bits or data) will be used for different cycles of the test, with the sequence of the changes being encrypted (known only to the matched fob and vehicle RKE controller). Since the thief will not know the sequence of changes, the thief will be unable to mimic the changes and must continue to keep the fob in the communication loop. Other methods could be used to ensure security of the air travel time test. For example, an identification code could be transmitted at the beginning and the end of the process to provide source authentication.

Figure 3:
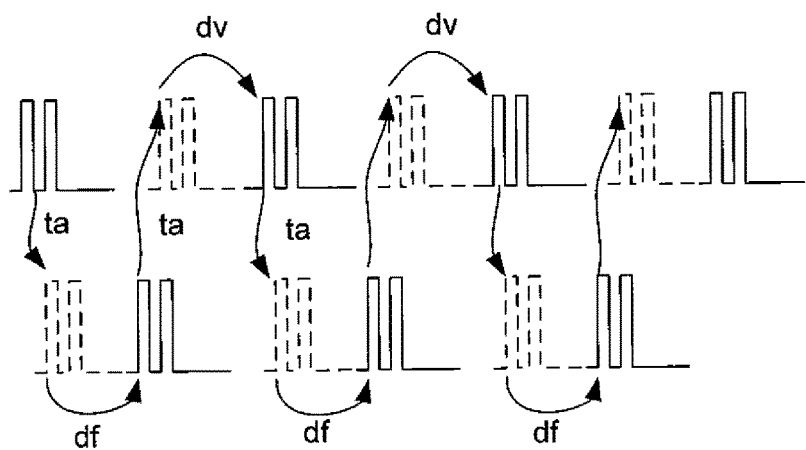
FIG. 3 is a timing diagram useful in understanding the 'multiple round trip' timing concept according to the present invention.

The implementation of these concepts, and particularly the timing details of the 'multiple trip' concept, may be better understood through reference to FIG. 3, which is a timing diagram of the test signals cycled between the fob and the RKE controller in the vehicle. The solid portion of the top trace of the timing diagram depicts the RE air travel test signal transmitted by the RKE controller in the vehicle, and the solid portion of the bottom trace depicts the RE air travel test signal transmitted by the fob. The dotted portion of the top trace represents the fob signal received at the RKE controller in the vehicle, and the dotted portion of the bottom trace represents the vehicle signal received at the fob.

The process, as shown in FIG. 3, proceeds as follows.

At the vehicle side, the RKE controller transmits certain bits (two, in the example shown in the figure) via RE It takes "ta" time for the signal to travel through the air or/and is other devices to the fob from the vehicle.

The fob receives the signal. The rising edge of the first bit of the signal triggers a timer (time counter) within the fob controller.

After "df" time count (the response delay at the fob), the fob sends a responsive RF signal back to the vehicle. The fob retains the measured value of df for use in a subsequent step.

It will again take "ta" time for the signal to travel through the air or/and other devices to the vehicle from the fob.

The RKE receiver in the vehicle receives the RF response. The rising edge of the first bit of the response signal triggers a timer (time counter) within the vehicle RKE controller.

After dv time at the vehicle side (the response delay at the vehicle), the vehicle sends an RE signal back to the fob. The vehicle retains the measured value of dv for use in the air travel time calculation.

The above process is repeated "n" times.

At the completion of nth round trip, the total trip time T1, as measured by the vehicle RKE controller, will add up to:

$$T1=2*n*ta+n*df+(n-1)*dv \quad (1)$$

At the vehicle, this T1 trip time is measured by a timer in or associated with a microcomputer in the RKE controller. The delay at the vehicle, dv, is known since the same vehicle clock is used for measuring that interval as for measuring the T1 interval. However the delay at the fob, df, is not known since the clock at the fob may not be well synchronized with the clock at the vehicle and may therefore be running faster or slower than the clock at the vehicle. To calculate air travel time (2*n*ta) with relatively high accuracy, it is desirable to know the duration of df in vehicle clock cycles.

To determine the duration of the fob delay df, the fob delay df is first increased by a known multiple "x" of the measured delay df, and then the test cycling process is repeated. In other words, the test process will be performed once using the inherent fob delay df, and the test process will then be performed a second time with the fob delay deliberately increased, at the fob, to df*x. The first process will yield a total process time of T1 as identified above. The second process will yield a total process time T2:

$$T2=2*n*ta+n*df*x+(n-1)*dv \quad (2)$$

By subtracting equation (2) from (1), we get:

$$T2-T1=\Delta T=n*df*(x-1) \quad (3)$$

And therefore—

$$n*df=\Delta T/(x-1) \quad (4)$$

We may plug the result (4) back into equation (1) to obtain a result that is independent of df:

$$T1=2*n*ta+\Delta T/(x-1)+(n-1)*dv \quad (5)$$

The n round trip air time is therefore:

$$\text{Airtime}=2*n*ta=T1-\Delta T/(x-1)-(n-1)*dv \quad (6)$$

All the numbers on the right hand of equation are either intervals counted by the same clock of the vehicles RKE controller, or simply predefined numbers (x). Thus, the microcontroller associated with the RKE controller at the vehicle may calculate the airtime (2*n*ta) with the equation (6). The measured air time will be directly dependent upon the distance between the fob and the vehicle, and thus will allow detection of intervention by thieves.

Figure 4:
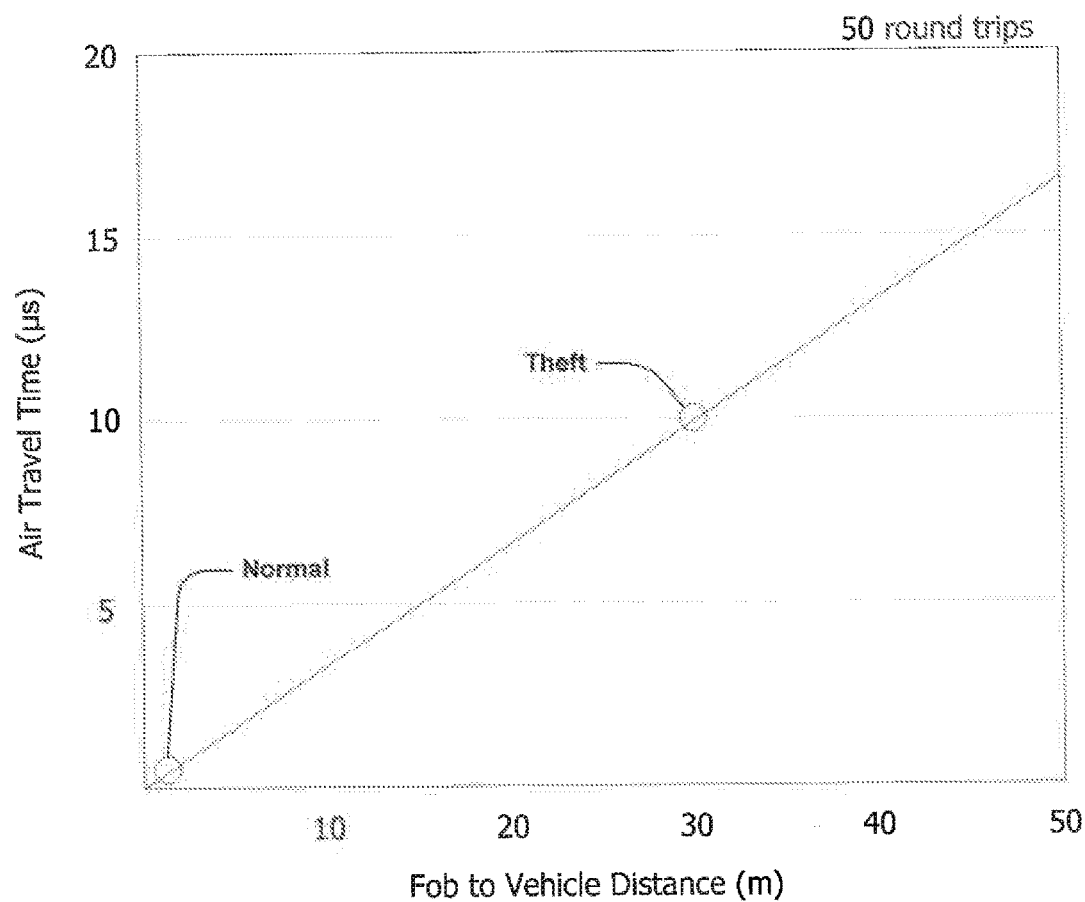
FIG. 4 is a graph showing the manner in which the transmission time, for fifty round trips, changes according to distance between the fob and the vehicle.

FIG. 4 shows the difference between the air travel times that will be measured for normal operation and theft relay operation. The distance between the fob and the vehicle is represented on the horizontal axis, and the resulting air time, in microseconds (μs), is represented on the vertical axis. The air travel time is a linear function of the distance separating the fob and the vehicle. The chart assumes that 50 round trips are employed. In the figure, the air travel time for 'normal operation' (fob adjacent to vehicle; no thieves) is a fraction of a microsecond (μs), whereas the air travel time is roughly 10 μs when the fob is 30 meters distant. (The distance of 30 meters is just an example of one possible distance at which a two-thief scenario would unfold.)

This actual air travel time, 10 μs, although much larger than a one-trip time, is still quite small. The air travel time will be a small fraction of the entire measured T1 or T2 because the delays at the vehicle and at the fob are much larger. If the delay times at the vehicle and the fob are, for example, both equal to 200 μs, then the sum total of these delay times over 50 round trips would be about 200*2*50=20 ms. The ratio of the air travel time (Airtime) to the total measured time (T1 or T2) is thus 10 μs/20 ms, or about 500 ppm. We can maintain the calibration between the fob and vehicle clocks within ⅒th of the above number: 1/500=50 ppm. With this calibration, the residual clock difference will not materially affect the air time determination.

The normal airtime, experienced when the driver is adjacent to the vehicle, will be stored in memory within the microcontroller associated with the RKE controller at the vehicle. If the calculated airtime exceeds the stored airtime by more than a preset amount, then the access request will be ignored even though the fob datagram contains the proper codes and encryption.

In the above process, the delay at the fob is factored out of the measurement by performing the air travel time test twice with different fob delays df. The need for a second air travel time test may be obviated if the fob is designed such that the fob delay df may be accurately estimated at the vehicle RKE controller without the second test pass. For example, the fob clock and delay time df may be calibrated to the vehicle clock in the factory during initial manufacture or, instead, the fob clock and delay time df may be characterized or modeled and the characterization or model stored in the vehicle RKE controller and thereafter used to adjust air travel time measurements.

The storing of information in the RKE controller may be done later, when the fob is matched to the vehicle RKE controller. That is, the fob and RKE controller may be programmed so that, when the fob is mated to a specific vehicle RKE controller, the characterization data can be downloaded to the RKE controller via the RF link, and then stored in the controller for later use in determining the value of df. Such methods will reduce the frequency zero-out processing time.

In either case, known techniques may be applied (e.g. temperature compensation) to help insure that the clock rate is maintained relatively stable over time, or a clock design may be used that is inherently stable.

In the vehicle, accurate measurement of vehicle delay time dv will depend upon such things as hardware switch times, response times and rising edge measurements. These elements could be calibrated and built into a look up table (vs. temperature) if required. Most errors, however, will vary from time to time in a Gaussian manner and will thus be self filtered due to use of multiple round trips. In any case, the air travel time measurement process will require a relatively high frequency clock counter since calculations are based on the vehicle side counter's count number. Most clock errors will also zero out over the measurement time.

Other techniques may be used to further enhance the security of the system. At the vehicle, the number of door handle pulls that will be allowed without a correct response will be limited to constrain a thief's ability to use multiple attempts to break the passive RKE security.

Also, two power levels may be used at the fob for RF transmissions during the air travel test process. The fob will transmit at high power in some communication cycles during the test, and will transmit at low power in other communication cycles. The sequence of the power levels will, again, be encrypted (known only to the matched fob and the vehicle RKE controller) to prevent a thief from faking the owner's fob air travel test response without going through the owner fob. If the correct sequence of power levels is not detected in the air travel test process, the RKE controller will reject the access request and deny access to the vehicle.

In addition to providing additional authentication of the test process, this use of two power levels will force the two thieves to be separated by a relative large distance. The device carried by the first thief, close to the vehicle, will have to be capable of mimicking the power levels employed, and thus that device will need to be capable of high power transmissions. The device carried by the second thief, close to the owner, will have to 'listen' for low power level transmissions to be sure that it does not miss any cycles of the test. Thus, the device will have to exhibit relatively high receiving sensitivity. If the two devices are relatively close (e.g. on the order of one hundred feet) high power transmissions by the first device (intended for receipt by the vehicle) will be received, spuriously, by the second device due to its high receiving sensitivity. The second device will not realize that the signal originated at the first device instead of the fob, and thus the second device will send the signal back to the first device. A feedback loop thereby created will corrupt the data and thus disrupt the thief operations. The thief operating distance (distance between the two devices) will have to be relatively large in order to avoid this self coupling. If the thieves are separated by a relatively long distance, however, then the air travel time will be increased accordingly and detection of the deception simplified.

From the above description of the invention, those skilled in the art will perceive improvements, changes and modifications. Such improvements, changes and modifications within the skill of the art are intended to be covered by the appended claims.

Having described the invention, the following is claimed:

1. A method for preventing security breaches of a passive remote keyless entry system for a vehicle comprising the steps of:
    sending radio signals back and forth between the vehicle and a remote fob multiple times, comprising:
        interrogating the fob a first time;
        receiving a first response from the fob;
        interrogating the fob a second time after the first response is received; and
        receiving a second response from the fob,
    measuring the total time for completion of the multiple round trips, and
    using the measured total time to evaluate the security of the connection between said fob and said vehicle.

2. A method as set forth in claim 1, wherein said step of interrogating said fob multiple times in succession comprises the steps of interrogating said fob, initiating the next interrogation in timed relation to the receipt of a valid response to the previous interrogation, and repeating the initiating step until a predetermined number of valid responses have been received from said fob.

3. A method as set forth in claim 2, wherein said fob responses are not all the same, and wherein said method further comprises the step of evaluating differences in said fob responses to verify that the responses came from an authorized fob.

4. A method as set forth in claim 2, wherein at least one of said fob responses differs in amplitude from another of said fob responses, and wherein said method further comprises the step of evaluating the amplitude of said fob responses to verify that the responses came from an authorized fob.

5. A method as set forth in claim 1, wherein said step of using the measured total time comprises the step of enabling at least one vehicle function only if said measured total time is below a threshold.

6. A method as set forth in claim 5, wherein said step of enabling comprises the step of enabling at least one of vehicle access and vehicle operation only if said measured total time is below a threshold.

7. A method as set forth in claim 5, and further comprising the step of adjusting at least one of said measured total time and said threshold to compensate for timing variations introduced by said fob.

8. A method as set forth in claim 7, wherein said step of adjusting includes the step of storing information characterizing said fob and using said stored information to make said adjustments.

9. A method as set forth in claim 7, wherein said step of adjusting includes the step of adjusting at least one of said measured total time and said threshold as a function of temperature.

10. A method as set forth in claim 1, wherein the said step of interrogating from said vehicle comprises the step of transmitting a low frequency RF signal.

11. A method as set forth in claim 10, wherein at least one interrogation time after said first time comprises the step of transmitting a high frequency RF signal.

12. A method as set forth in claim 1, wherein said step of sending radio signals back and forth comprises the step of transmitting the first and second responses so as to differ from one another in a sequence, and wherein said method further comprises the step of evaluating said sequence at said vehicle to verify that said first and second responses were generated by an authorized said fob.

13. A method as set forth in claim 12, wherein said step of transmitting the first and second responses that differ from one another comprises the step of transmitting the first and second responses so as to have different power levels from one another.

14. A method as set forth in claim 1, further comprising the steps of measuring temperature; and using temperature compensation to maintain a stable clock rate to evaluate the security of the connection.

15. A method as set forth in claim 1, and further comprising the step of performing the sending and measuring steps a first time and a second time to produce respective first and second total times, introducing at said fob a known delay in the fob responses one of said first and second times, and using the difference between said first and second total times to provide a compensated time having reduced dependence upon fob characteristics.

16. A method as set forth in claim 1, further comprising the step of limiting the number of door handle pulls that will be allowed without a correct response from the fob.

17. A method as set forth in claim 16, wherein said step of detecting a request for operation of a vehicle door comprises the step of detecting human contact with the handle of the door of the vehicle.

18. A method as set forth in claim 1, wherein the step of sending radio signals back and forth comprises using a single RF antenna on the vehicle to receive multiple radio signals spaced in time from one another from the remote fob.

19. A method as set forth in claim 1, wherein the step of measuring the total time comprises determining the difference in time between interrogating the fob a first time and receiving the second response from the fob.

* * * * *